United States Patent Office 3,445,690
Patented May 20, 1969

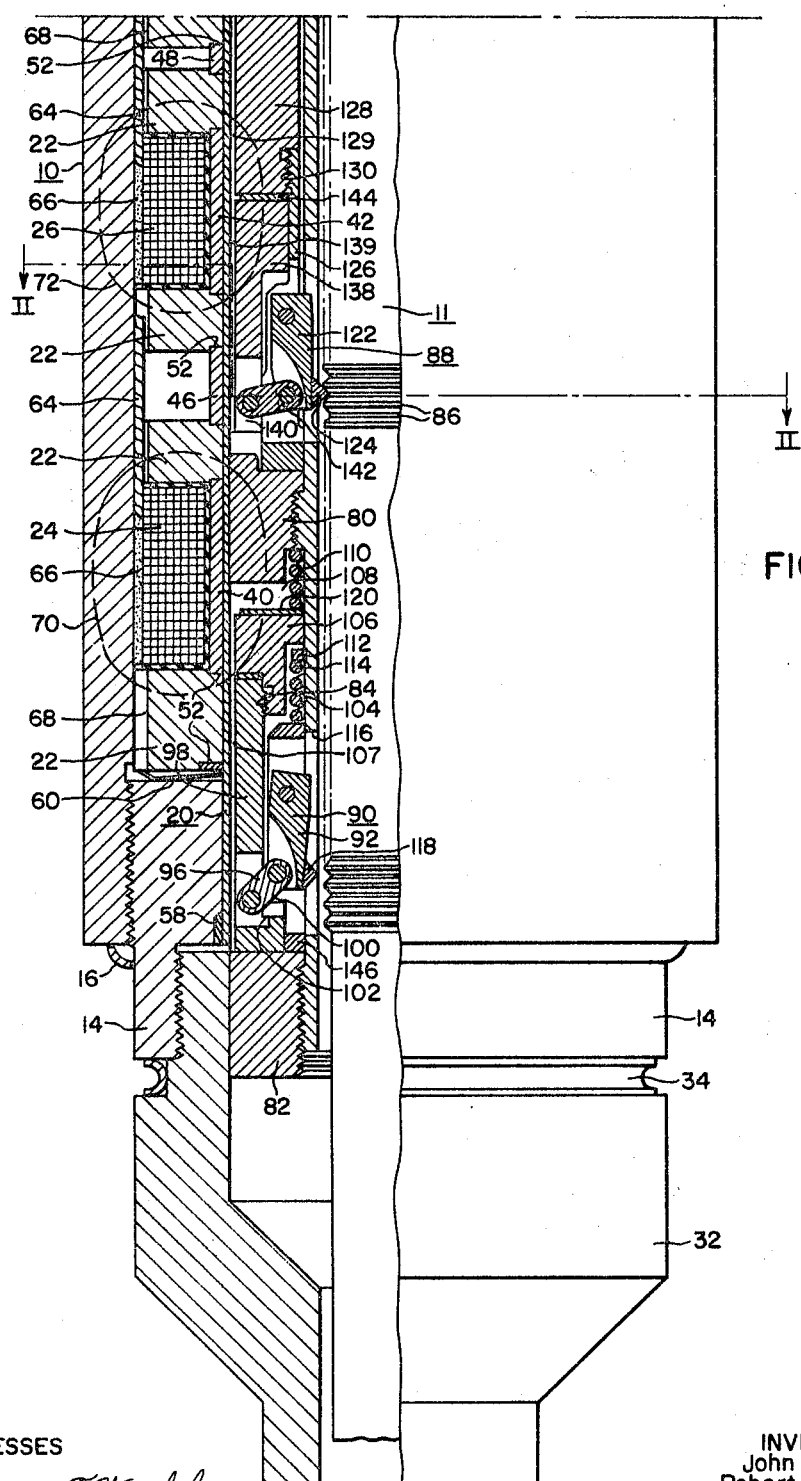

3,445,690
LINEAR MOTION DEVICE AND IMPROVED
HOUSING THEREFOR
John P. Thorel, Northridge, Calif., and Robert E. Downs
and Donald G. Sherwood, Pittsburgh, Pa., assignors
to Westinghouse Electric Corporation, Pittsburgh, Pa.,
a corporation of Pennsylvania
Filed Apr. 5, 1965, Ser. No. 445,540
Int. Cl. H02k 41/02
U.S. Cl. 310—14                                   10 Claims

ABSTRACT OF THE DISCLOSURE

A linear motion device which effects linear movement of an element positioned within a hermetically sealed system is formed with coil means isolated from the interior of the sealed system for effecting the linear movement. For pressurized system applications the pressure barrier for the linear motion device is a housing positioned outwardly of the coil means rather than between the coil means and the linear element. Hermetic isolation of the coil means from the interior of the system is achieved by the use of a relatively thin elongated enclosure means or "can" which of itself cannot withstand the internal pressure but which acts to translate the internal pressure to the other pressure barrier, whereby improved magnetic penetration of the coil means operating the linear motion actuators is achieved.

---

Figure 2:
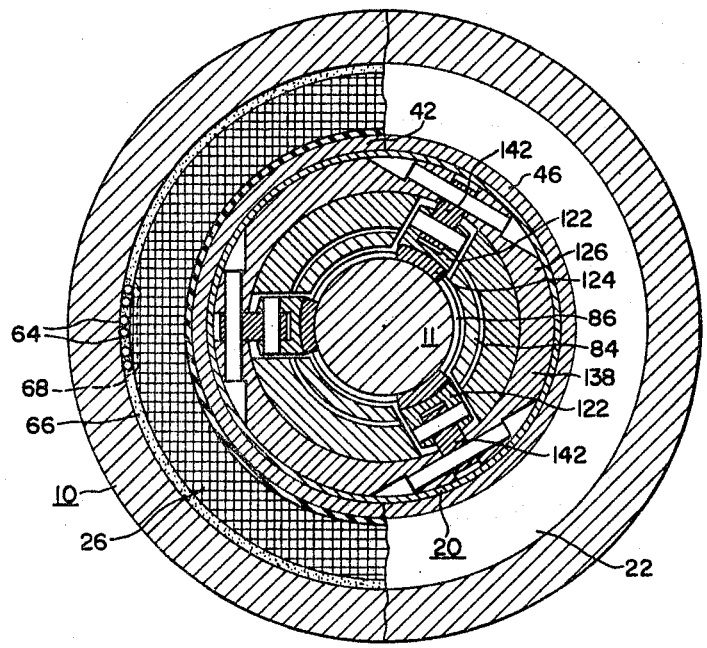

The present invention relates to linear motion devices of the rectilinear incremental type, and more particularly to an improved coil structure and housing for such devices.

There are many applications wherein it is desired to actuate a control element in a linear direction to desired or predetermined positions for the purpose of controlling various chemical and physical processes or reactions, or for the purpose of actuating various elements of a complex mechanism. As an applicative example, the production of controlled amounts of power from a nuclear reactor requires the insertion of a number of control rods into the reactor vessel in order to control the chain reaction developed in the core of the reactor.

In certain types of linear motion devices, a plurality of solenoid coils are mounted in a manner to secure by electromagnetic attraction or by magnetic manipulation of suitable latching devices a linear element passing through the coils. One or more of the coils is utilized in combination with mechanical or electromagnetic gripping means to secure the element to a fixed member, until another coil or coils can be energized to secure the element to a movable member. The movable member, in turn, is moved in either direction of a straight-line path of travel by displacement coil means. The linear element is caused to move through successive increments of motion in either direction by electromagnetically actuating the motion inducing mechanism. In many such devices, the weight of the linear element or drive shaft is considerable, thereby necessitating the use of rather bulky coil and magnetic structures, which have had to be mounted on the external surfaces of the housing for the device.

In those cases where the linear motion devices are operated under extreme pressures for example, in the order of 2000 p.s.i. in the aforementioned nuclear reactor application, the employment of the thus required thick pressure housings necessitated relatively large structural welds in order to incorporate non-magnetic inserts spaced along the length of the housing to define the magnetic circuits of the respective coils. Such welds are time-consuming to fabricate and difficult to make leak-tight. Also, the application of linear motion devices frequently find them in a corrosive environment thereby requiring the heavy housing structure to be fabricated from a non-corrosive material such as magnetic stainless steel.

As already indicated, previous arrangements of the housing and coil structure of the linear motion devices of the character described, placed the housing between the coil structure and the linear element with the result that the major portion of the housing structure had to be fabricated from a magnetic material but had to be interrupted along its length by non-magnetic structural welds or inserts to afford the proper magnetic structures for the individual coils. The welded housing, of course, is very expensive to make. Moreover, inasmuch as the coil structure of the linear motion device had to be mounted outside of their housings, the coils must be large to transmit sufficient flux through the housing and the devices are not capable of submerged or underwater operation. In certain reactor applications, it is desirable to submerge or contain the reactor entirely within a water-filled shield tank for purposes of radiation attenuation. This desirability applies equally to the entire linear motion device or rod drive mechanism inasmuch as the interior of the housing communicates with the reactor vessel and thus contains portions of the radioactive coolant.

The aforedescribed and other difficulties of prior linear motion devices are alleviated by the present invention which provides a unique arrangement of a housing and solenoid coil means for the aforementioned linear motion devices. The arrangement of the invention permits the coil and attendant magnetic structures therefor to be placed inside the housing and arranged so that the housing completes the magnetic circuits without the use of the large structural welds and non-magnetic inserts of the prior art devices. However, the coil and magnetic structures are segregated from the reactor coolant or, in other applications, from whatever corrosive fluid or atmosphere may be contained within the linear motion device by a continuous hermetic sealing means extended continuously along the inner wall or bore of the linear motion device. By the unique arrangement of the coil means together with their magnetic components and attendant structural members of the linear motion device the hermetical sealing means is supported or backed up throughout its length by the exterior pressure housing, which engages these components and structural members.

The linear element or drive shaft and other moving elements of the drive mechanism such as gripping members, latch members and their movable actuators are contained within the bore defined by the hermetically sealed coil means, which, however, are sealed from the linear element and associated moving elements. Desirably, the hermetic sealing means is made from a nonmagnetic material and is made as thin as possible to reduce its magnetic reluctance.

Finally, the invention eliminates the use of tie rods and/or similar components employed to clamp the external coil structures together on the exterior housing surfaces of prior linear motion devices. As a footnote to this discussion, it may be pointed out that the external housing arrangement of the linear motion device disclosed herein readily permits the use of an external cooling jacket to remove waste heat generated by the coil means where it is not possible or desirable to submerge the devices in a suitable coolant.

In view of the foregoing, it is an object of the invention to provide a novel and efficient linear motion device.

More specifically, it is an object of the invention to provide a novel arrangement of an external housing and internal coil structure for linear motion devices.

A further object of the invention is to provide a linear motion device of the character described wherein the coil structure can be positively hermetically sealed from the linearly moving element of the device.

Another object of the invention is to provide a linear motion device of the character described wherein the coil means and magnetic structures associated therewith can be hermetically sealed not only from the internal moving parts of the device but also from the ambient atmosphere.

Another object of the invention is to facilitate the making of wiring connections to the coil means of a hermetically sealed linear motion device.

Still other objects of the invention are to provide in a linear motion device a completely submergible housing, to eliminate the relatively large non-magnetic inserts and/or structural welds of the housing therefor while at the same time employing the housing as part of the magnetic circuit, to reduce the required size of the coil structure and attendant components in a linear motion device, and to provide a unique arrangement of parts which permits an external pressure housing of the linear motion device to backup or to support an internal hermetic sealing means of the linear motion device.

Figure 1A:
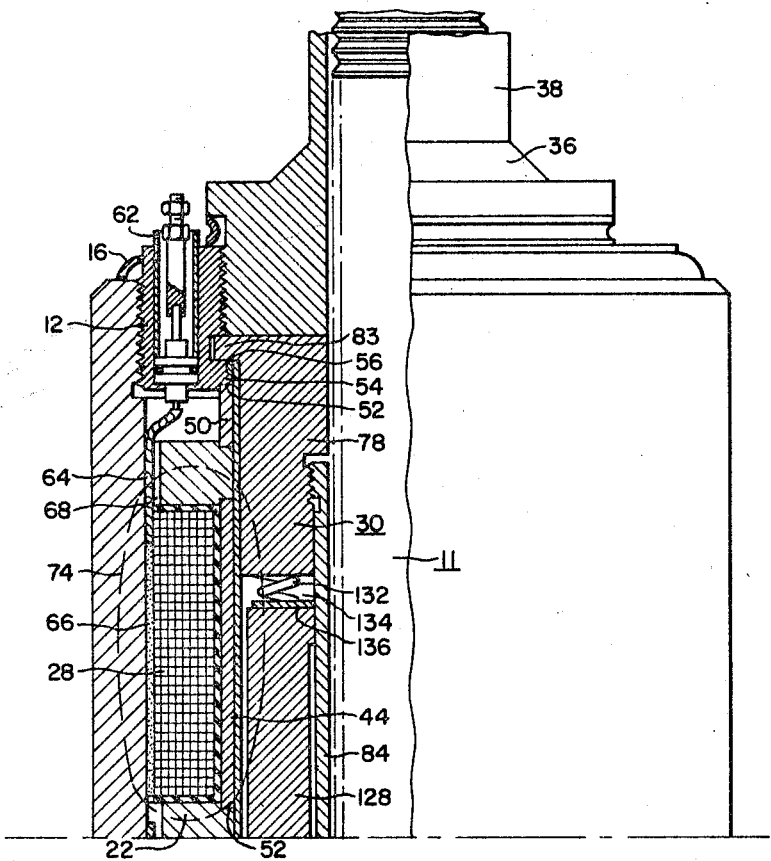

The above and other objects and features of the invention will become apparent from the following detailed description taken in conjunction with the accompanying drawings which form a part of this specification, and in which:

FIGURES 1A and 1B when placed end to end comprise a partially broken-away longitudinally sectioned view of one form of a linear motion device arranged in accordance with the invention; and FIG. 2 is a cross-sectional view of the linear motion device shown in FIG. 1 and taken along reference line II—II thereof.

Referring now to the drawings in greater detail, the exemplary form of the invention illustrated therein includes an external pressure housing 10 of generally cylindrical configuration and smooth contour, through which a linearly movable element 11 can be inserted. Upper and lower end closure rings or annular end members 12 and 14 are secured respectively to the end portions of the housing 10 as by threading. In this arrangement of the invention wherein the linear motion device is employed in a hazardous environment, the end rings 12 and 14 are hermetically sealed to the external housing 10 by means of weld containers or canopy welds 16. The hermetic enclosure for the coil structure denoted generally by the reference character 18 is completed by means of a generally cylindrical hermetic sealing means or can 20. The can 20 is supported by a plurality of magnetic annular coil circuit members or end plates 22, with a pair of such plates being employed with each of the three tubular coil means 24, 26 and 28. It will be appreciated, however, that differing types of electromagnetic linear motion devices may employ a different number of coils.

The specific functions of the coil structures 24, 26 and 28 likewise will depend upon the arrangement of the mechanical or electromagnetic gripping means, here denoted generally by the reference character 30, employed within the can 20. For the particular gripping and actuating means 30 described herein, but not essential to the nature of the present invention, the coil means 24, 26 and 28 functionally can be designated as the load transfer coil 24, the latch coil 26 and the lift coil 28. However, the functional and operational details of the coils 24, 26 and 28 together with the gripping and linearly actuating mechanism 30 will be described below in greater detail.

The housing 10 thus far described is secured as by threading at its lower end to a pressure vessel adaptor, denoted generally by the reference character 32, and is sealed thereto by the canopy weld 34. At its upper end, the housing 10 similarly is joined by the means of its end ring 12 to a thickened end portion 36 of the linear element housing, a portion of which is denoted by the reference character 38.

Returning now to the annular coil end plates 22, it will be seen from FIG. 1 that the outer peripheries of the end plates 22 are closely fitted against the adjacent internal surfaces respectively of the housing 10 for the purpose of affording a magnetic circuit of good permeability and to provide, together with structures presently to be described, adequate support for the hermetic sealing means or can 20. The latter is continuously supported throughout its length by the aforementioned end plates and by a plurality of variously sized non-magnetic tubular segments 40, 42 and 44 which overlie the coils 24, 26 and 28, respectively, and by an additional number of tubular segments 46, 48, and 50, the individual lengths of which are determined so as to properly position the coils 24, 26 and 28 with associated components of the gripping and actuating means 30, as will be made more apparent hereinafter. Each of the tubular segments 40–48 is retained between an adjacent pair of the annular end plates 22 by insertion of its ends into aligned notches 52 formed on each side of the end plates 22 adjacent their inner peripheries. Similarly, the backup ring 50 is retained by the uppermost end plate 22, as viewed in FIG. 1, and the housing end ring 12, whose adjacent side likewise is provided with a notch 52'. The can 20 is secured at its upper end to an inwardly extending lip 54 of the end ring 12 by a circular seal weld 56. Likewise, at its lower end, the can 20 is secured to the lower end ring 14 by a seal weldment 58. Before welding the can 20 as described, however, the housing end rings 12 and 14 are tightened by threading to apply longitudinal compression to the assembly of coil end plates 22 and their associated components. In order to assure that no gaps occur between the various end plates and backup rings 40–50 throughout the life of the linear motion device, such compression is resiliently maintained by placing a Belleville-type spring washer 60, or equivalent spring biasing means, between the lowermost end plate 22 and the abutting surface of the lower housing end ring 14.

The end plates 22 can be fabricated from a good magnetic material such as carbon steel which is a relatively inexpensive structural material. Similarly, the external pressure housing 10 is fabricated from a relatively inexpensive steel such as SA–266 Gr. II, which also is a good magnetic material. On the other hand, to prevent shorting out of the individual magnetc circuits of the coils 24, 26 and 28, and as denoted by flux patterns 70, 72 and 74, the backup rings 40–50 are fabricated from a non-magnetic material such as cold-worked 304 stainless steel.

In order to supply electric current to the coils 24, 26 and 28, the upper end ring 12 is provided with a plurality of terminals denoted generally by the reference character 62 of known construction, with six being employed in this arrangement of the invention. In order to conduct electrical leads 64 to the various coils, which are spaced inwardly of the pressure housing 10 through the use of potting compound denoted by the reference character 66, the end plates 22 are each provided with an outer peripherally transverse notch or wire-way 68, as better shown in FIG. 2 of the drawings. To promote interchangeability of parts, the lowermost end plate 22, as viewed in FIG. 1 of the drawings, can also be provided with the wire-way notch 68, which is not used in this arrangement of the invention, and both of the inner peripherally circumferential notches 52, one of which is not used in the present arrangement.

In this arrangement of the invention, the use of much less expensive structural materials is permitted even when the linear element or drive shaft 11 is employed in a highly corrosive environment. This is accomplished through the use of the corrosion-resistant can 20, fabricated from a non-magnetic material such as Inconel (trademark) of the order of 15 to 20 mils in thickness. As will be pointed out below, the can 20 can be made relatively thin inasmuch as it is not substantially contacted by moving parts and is able to sustain high pressure because of backup rings 40–50.

Having thus described the novel pressure housing and coil containment of the invention, attention now will be given to a detailed description of a suitable gripping and actuating means for use with the invention for inducing stepwise movement of the linear element 11. The illustrative gripping assembly is described in complete detail in Frisch Patent 3,158,766 issued Nov. 24, 1964 and assigned to the present assignee. In this arrangement of the invention an upper stop member 78, an intermediate stop member 80 and a lower stop member 82, each of annular configuration, are provided within the can 20 and closely adjacent the inner surface thereof. The stop members 78, 80 and 82 serve to limit the movements of the respective armatures 106, 128 and 138, associated with the solenoid coils 24, 28, and 26, respectively, and described hereinafter. The stop members 78, 80, and 82 are fixedly mounted relative to one another in axially spaced relationship by a sleeve member or tubular spacer 84 threadedly connected to each of the stop members and defining the path of travel of the linear element or drive rod 11. It will be understood, of course, in other applications of the invention, that a different number of coil means and armature or armatures therefor can be employed.

In this arrangement of the invention the tubular spacer 84 extends continuously from the uppermost stop member 78 to the lowermost stop member 82, with the upper stop member and other components of the gripping and actuating mechanism 30 being mounted adjacent the upper housing end ring 12. In furtherance of this purpose the upper stop member 78 is provided with an outwardly extending annular projection 83 overlying the lip 54 of the upper end ring 12, where it is clamped by threaded securement of the adjacent, thickened portion 36 of the linear element upper housing 38. The lower stop member 82 slidably engages the inner surface of the adaptor 32 for axial positioning and for allowance of differential thermal expansion between components of the linear motion device. To prevent wearing of the can member 20 the lower stop member is mounted below the adjacent lower end of the can member. If desired, the upper stop member 78 and intermediate stop member 80 can be provided with slight clearances (not shown) relative to the adjacent portions of the can member 20 to minimize wear of the can. The upper housing 38, of course, communicates with the interior of the linear motion device to permit the latter to be subjected to substantial internal pressures.

In this arrangement of the invention the linear element, such as a drive rod or lead screw 11 includes a plurality of axially spaced teeth 86 which extend circumferentially about the outer surface of the drive rod 11. A pair of gripper assemblies are provided to engage the lead screw 11 and to provide incremental linear movement thereof in opposite directions. The upper gripper assembly is denoted generally by reference character 88 and the lower gripper assembly is denoted generally by reference character 90. The lower gripper assembly is provided with at least one gripper arm 92 which is pivotally secured to a support annulus 94. In this application, three such arms 92 are utilized with one being shown. A link member 96 is pivotally secured to each gripper arm 92 and to a second support tube 98. The support tube 98 extends downwardly to a position of engagement with the lower stop 82. The support annulus 94 desirably is provided with a downwardly facing shoulder 100 which is disposed to be engaged by a circumferential flange 102 formed on the lower end of the support tube 98 and underlying the shoulder 100. The flange 102 desirably is spaced from the shoulder 100 when the coil 24 is deenergized, with the space being slightly less than the magnetic gap 108 for load transfer purposes as described below.

The support tube 98 is secured by suitable means such as by threading at 104 to a gripper operating armature 106 of tubular configuration. The gripper armature 106 and the intermediate stop 80 comprise the poles for the lower gripper or load transfer coil 24. The armature 106 is slidably mounted upon the sleeve 84 and spaced from the can 20 to provide clearance 107 and thus to prevent wearing contact therewith. The armature 106 is movable, upon energization of the coil 24 toward the lower surface of the stop member 80 to close the air gap 108 therebetween. Biasing means such as a spring 110 is disposed in compression between the stop member 80 and the upper surface of the armature 106 to ensure reopening of the gap 108.

Load transfer means are coupled to the lower gripper assembly 90 and comprises a stop ring 112 secured against a shoulder formed on the outer surface of the spacer tube 84 together with a biasing means such as a coil spring 114 which is compressed between the stop ring 112 and the upper surface of the gripper support annulus 94. The biasing means 114, upon energization of the coil 24, prevents the gripper support annulus 94 from moving upwardly against the force of the spring 114 until the flange 102 engages the shoulder 100.

Energization of the lower gripper or load transfer coil 24 creates a magnetic flux through the air gap 108 which tends to close the latter. The armature 106 moves upwardly toward the stop member 80 against the force of the coil spring 110. It is to be noted that the flux pattern 70 created by energization of the coil 24 extends through its external pressure housing 10 and the adjacent coil end plates 22.

During the initial upward movement of the armature 106 to close the air gap 108, the support annulus 94 remains stationary and the gripper arm 92 is swung inwardly through an opening 116 to the spacer tube 84 until the tip 118 thereof is in non-bearing engagement with the drive rod 11. At that point, the flange 102 engages the shoulder 100 and the armature 106 carries the support annulus 94 and the gripper assembly 90 upwardly for a distance sufficient to shift the weight of the drive rod to the lower gripper arms 92, and to remove the drive rod weight from the upper gripper assembly 88. A suitable non-magnetic washer 120 is mounted on the upper surface of the armature 106 for the purpose of ensuring rapid decay of flux when the coil 24 is deenergized.

The upper gripper assembly 88 is provided, in this example, with a like number of pivotally movable gripper arms 122 having wear resistant inwardly extending tips or projections 124 thereon, with the latter projections being disposed to engage the teeth 86 of the drive rod 11. The upper gripper assembly support tube 126 desirably is connected, as by threads 30, to a linearly movable tubular armature 128. The armature 128 forms a movable pole of the lift coil 28 and for this purpose is slidably mounted on the spacer tube 84 and provided with clearance 129 relative to the can 20. The other pole of the lift coil 28 comprises the upper or fixed stop member 78. Resilient means including coil spring 132 desirably are disposed in the gap 134 of the lift coil 28. The resilient means or spring 132 has one end thereof engaging a non-magnetic washer 136 placed on the upper surface of the armature 128 and has its other end (not shown) disposed in a recess (not shown) formed in the lower surface of the upper stop 78. In this manner, when the gap 134 is closed by energizing the lift coil 28, the spring is compressed and recedes entirely into the last-mentioned recess.

Movement of the armature 128 to close the gap 134 results in upward movement of the support tube 126 together with the upper gripper assembly 88. In the event the arms 122 of the upper gripper assembly 88 are in the latched position relative to the drive rod 11, the upward movement of the pole 128 results in the lifting of the lead screw or drive rod 11.

Pivotal movement of the upper gripper assembly 88 into and out of engagement with the drive rod 11 is accomplished by the energization or deenergization of the upper gripper or latch coil 26. The latch coil 26 includes as a pole thereof the armature 128 together with a gripper operating armature 138. The gripper operating armature 138, which is slidably mounted on the support tube 126 with clearance 139 relative to the can 20, includes a downwardly extending projection 140 which pivotally supports one end of link members 142. The link members 142 are pivotally mounted at their other ends on the lower ends of the gripper arms 122. A non-magnetic washer 144 is supported on the gripper operating armature 138. The latch coil 26 is illustrated in the drawing as energized, so that the air gap between the armatures 128 and 138 is completely closed. Deenergization of the coil 26 would result in a downward movement of the armature 138 relative to the armature 128 and would cause pivotal movement of the gripper arm 122 about the link member 142 out of engagement with the teeth 86 of the drive rod 11, thereby moving the arms 122 to the unlatched position.

With the arrangement of the drive mechanism 30 described above for incrementally moving the linear element 11, it will be seen that the linearly movable armatures 106, 128 and 138 thereof do not wearingly engage the can 20 from which they are spaced as denoted respectively by clearances 107, 129 and 139. Thus, actuation of the drive mechanism 30 by the solenoid coil means represented exemplarily here by the coils 24, 26 and 28 does not cause wearing of the can member 20. In addition, the threads 86 are spaced apart a sufficient distance to provide a clearance between adjacent threads and latch arm tips 118 and 124. Such clearances prevent wear of the tips 118 and 124 as described in the above identified Frisch patent.

*Operation—Upward movement*

Operation of the linear motion device as illustrated is achieved by sequentially energizing and deenergizing the coils 24, 26 and 28 in a predetermined manner, through suitable control circuitry (not shown). For example, if incremental upward movement of the drive rod 11 is desired, the lift coil 28 is energized to close the gap 134, with the gap adjacent washer 144 already closed by the illustrated energization of latch coil 26, and thereby to move the upper gripper assembly 88 together with the drive rod 11 incrementally upwardly for a distance equal to the width of the gap 134 which, in this case, is also equal to the pitch between adjacent teeth 86 of the drive rod 11.

Next, the load transfer coil 24 is energized to retain the drive rod 11 by actuating the lower gripper assembly 90 from the unlatched position to the latched position which transfers the load or weight of the drive rod 11 entirely to the lower gripper arms 92, when the flange 102 engages the shoulder 100 of the support annulus 94, so that the upper gripper arms 122 are now in non-bearing engagement with hte drive rod 11.

The latch coil 26 is now deenergized resulting in downward movement of the upper gripper armature 138 and pivotal outward movement of the upper gripper arms 122. The left coil 28 is then deenergized to open the gap 134 under the force of the spring 132, which induces downward movement of the armature 138 with the upper gripper arms 122 remaining in the unlatched position. The latch coil 26 then is energized to move the upper gripper arms inwardly to a position of non-bearing engagement with the drive rod.

Finally, the load transfer coil 24 is deenergized first causing the lower gripper arms 92 to move downwardly under the force of the spring 114 until the weight of the drive rod 11 rests entirely upon the upper gripper arms 122, placing the latter in the latched position and until a clearance exists between the tips of the lower gripper arms 92 and the adjacent teeth 82. Further downward movement of the support tube 94 and the gripper arms 92 is now prevented by the engagement of the lower end 146 of the support tube 94 with the upper surface of the lower stop 82. Downward movement of the armature 106, however, continues causing the gripper arms 92 to move outwardly away from the drive rod 11 to the unlatched position. At this stage the linear motion device is now in its initial condition and further upward incremental movement is achieved by repeating the complete cycle.

*Operation—downward movement*

Downward incremental movement of the drive rod 11 is achieved by sequentially energizing and deenergizing the coils 24, 26 and 28 as follows:

First, the load transfer coil 24 is energized moving the lower gripper arms 92 to the latched position, which removes the weight of the drive rod 11 from the upper gripper arms 122. Next, the latch coil 26 is deenergized moving the upper gripper arms 122 away from the drive rod 11 to their unlatched positions. The lift coil 28 is energized to close the gap 134 thereby moving the upper gripper arms 122, while retaining the same in the unlatched position an upward increment, while the drive rod 11 is held motionless by the lower gripper assembly 90. The latch coil 26 now is energized to move the armature 138 into engagement with the armature 128 and to displace the upper gripper arms 122 toward the latched position. The load transfer coil 24 now is deenergized to transfer the weight of the drive rod 11 to the upper gripper arms 122 and to permit the lower gripper arms 92 to move to the unlatched position. The lift coil 28 now is deenergized moving the upper gripper arms 122 downwardly with the drive rod 11 through one increment under the force of the spring 132 and the weight of the drive rod 11. Further downward incremental movement of the drive rod 11 is achieved by repeating the above-described cycle. Rapid lowering or "scram" of the drive rod 11 can, of course, be accomplished by the simultaneous deenergization of all the coils 24, 26 and 28 to permit free-fall of the drive rod.

Although the invention has been described in connection with a specific applicative arrangement, it will be readily apparent to those skilled in the art that various changes in form and arrangement of parts may be made to suit requirements without departing from the spirit and scope of the invention.

We claim as our invention:

1. In a linear motion device the combination comprising a plurality of generally tubular coil means and associated magnetic circuit members mounted in spaced end-to-end relationship, means for magnetically segregating said coils and their respective circuit members, an elongated unitary external tubular housing having a straight through bore extending along at least a substantial portion of the longitudinal dimension thereof fabricated from a magnetically permeable material said housing closely receiving in the bore thereof all of said magnetic circuit members, said housing completing the external magnetic circuits respectively of said coil means, a linearly movable element and driving means therefor mounted within the bore extending through said coil means, and non-magnetic sealing means coextending with said coil means bore peripherally outwardly of said linear member and driving means, said non-magnetic sealing means having the ends thereof secured and sealed to the adjacent respective ends of said housing to seal said coil means from the interior of said coil means bore.

2. In a linear motion device the combination comprising a generally tubular elongated unitary relatively heavy external pressure housing having a straight through bore extending along at least a substantial portion of the longitudinal dimension thereof, a plurality of generally tubular coil means and magnetic circuit members closely fitted within the bore of said housing and axially spaced therealong, a continuous relatively thin non-magnetic can member extending through the bore thus defined by said coil means and magnetic circuit members, said can member having its ends secured and sealed respectively to the adjacent ends of said housing to seal said coil means and magnetic members within said housing, said can member engaging said magnetic members for at least partial support thereby, and a linearly moving element and driving mechanism therefor mounted within said can member for actuation by said coil means.

3. In a linear motion device the combination comprising a generally tubular elongated unitary external pressure housing having a straight through bore extending along at least a substantial portion of the longitudinal dimension thereof, a plurality of generally tubular coil structures and annular magnetic circuit members closely fitted within the bore of said housing and axially spaced therealong, a continuous non-magnetic can member extending through the bore defined by said coil structures and magnetic circuit members, said can member having its ends secured and sealed respectively to the adjacent ends of said housing to seal said coil structures and magnetic members within said housing, said can member engaging said magnetic members for at least partial support thereby, a non-magnetic tubular segment overlying the inner surface of each of said coil structures and supported by its magnetic circuit members, at least one magnetic tubular segment extending between and spacing opposed ones of said magnetic members and supported thereby, the inner peripheries of said magnetic members and said non-magnetic segments forming a continuous smooth bore extending substantially through said linear motion device and contiguously supporting the outer surface of said can member, and a linearly moving element and driving mechanism therefor mounted within said can member for actuation by said coil means.

4. In a linear motion device the combination comprising a generally tubular unitary external magnetic housing having a straight through bore extending along at least a substantial portion of the longitudinal dimension thereof, a plurality of generally tubular coil means and end magnetic circuit members therefor closely fitted within said housing, said housing being fabricated from a magnetically permeable material so that said housing and said magnetic members can complete the magnetic circuit of said coil means, continuous non-magnetic sealing means extending substantially through the bore defined by said circuit members, said sealing means being joined at the ends thereof to the adjacent ends respectively of said housing and being at least partially supported by said circuit members, and a linearly movable element and driving mechanism therefor contained within said sealing means for actuation by said coil means.

5. In a linear motion device the combination comprising a generally tubular external housing, generally tubular coil means and end magnetic circuit members therefor closely fitted within said housing, said housing being fabricated from a magnetically permeable material so that said housing and said magnetic members can complete the magnetic circuit of said coil means, continuous sealing means extending substantially through the bore defined by said magnetic members, said sealing means being joined at the ends thereof to the adjacent ends respectively of said housing and being at least partially supported by said magnetic members, a linearly movable element and driving mechanism therefor contained within said sealing means for actuation by said coil means, and electrical conductors for supplying electric potential to said coil means, said conductors extending through a wire way defined by a groove extending across at least one of said magnetic members and enclosed by the adjacent surface of said housing.

6. In a linear motion device the combination comprising a generally tubular outer housing fabricated from a magnetically permeable material, an annular housing and closure inserted into and secured adjacent one end of said housing, generally tubular coil means and end magnetic circuit members therefor inserted into said housing in closely fitted relation and closely spaced from said closure, at least one generally tubular non-magnetic segment bearingly engaging said magnetic members to maintain their separation, an additional non-magnetic tubular segment bearingly engaging the adjacent one of said magnetic members and said closure, said closure having a number of electric terminals extending therethrough for supplying electric potential to said coil means, a second annular end closure threadedly secured and inserted into the other end of said housing, said last-mentioned closure being threadable to a position of bearing engagement with the adjacent one of said magnetic members to apply compressive forces to said coil means and said magnetic members and said tubular segments all of which define a bore extending substantially through said housing, and a linearly movable element and driving mechanism therefor contained within said bore for actuation by said coil means.

7. In a linear motion device the combination comprising a generally tubular outer housing fabricated from a magnetically permeable material, an annular end closure inserted into and secured adjacent one end of said housing, generally tubular coil means and end magnetic circuit members therefor inserted into said housing in closely fitted relation and closely spaced from said closure, at least one generally tubular non-magnetic segment bearingly engaging said magnetic members to maintain their separation, an additional non-magnetic tubular segment bearingly engaging the adjacent one of said magnetic members and said closure, said closure having a number of electric terminals extending therethrough for supplying electric potential to said coil means, a second end closure threadedly secured and inserted into the other end of said housing, said last-mentioned closure being threadable to a position of bearing engagement with the adjacent one of said magnetic members to apply compressive forces to said coil means and said magnetic members and said tubular segments all of which define a bore extending substantially through said housing, means for hermetically sealing the junction between said housing and said housing end closures, a continuous can member extending through said bore and continguously supported by said magnetic members and said non-magnetic segments, the ends of said can member being joined and sealed respectively to said housing end closures, and a linearly movable element and driving mechanism therefor contained within said bore for actuation by said coil means.

8. In a linear motion device the combination comprising a generally tubular outer housing fabricated from a magnetically permeable material, an annular end closure inserted into and secured adjacent one end of said housing, generally tubular coil means and end magnetic circuit members therefor inserted into said housing in closely fitted relation and closely spaced from said closure, at least one generally tubular non-magnetic segment bearingly engaging said magnetic members to maintain their separation, an additional non-magnetic tubular segment bearingly engaging the adjacent one of said magnetic members and said closure, said closure having a number of electric terminals extending therethrough for supplying electric potential to said coil means, a second housing end closure threadedly secured and inserted into the other end of said housing, said last-mentioned closure being threadable to a position of bearing engagement with the adjacent one of said magnetic members to apply compressive forces to said coil means and said magnetic members and said tubular segments all of which define a bore extending substantially through said housing, sealing means overlying said bore and extending therethrough for sealing said coil means from the interior of said bore, said sealing means having ends thereof joined and sealed respectively to said housing end closures, said first-mentioned closure being hermetically sealed to said housing, said second-mentioned closure being seal welded to said housing for hermetic sealing purposes and to prevent turning of its threaded engagement with said housing, resilient biasing means inserted between said last-mentioned closure and the adjacent magnetic member to maintain said compression throughout thermal cycling of said linear motion device, and a linearly movable element and driving mechanism therefor contained within said bore for actuation by said coil means.

9. In a linear motion device the combination comprising a generally tubular unitary outer housing fabricated from a magnetically permeable material and having a straight through bore extending along at least a substantial portion of the longitudinal dimension thereof, a pair of annular end closures inserted respectively into the ends of said housing and hermetically secured and sealed thereto, a plurality of generally tubular coil means and annular end magnetic circuit members therefor closely fitted within the bore of said housing, means for positioning said coil means between said end closures, said housing and said end members being positioned to complete the magnetic circuit of each of said coil means, a can member extending continuously between said end closures and being hermetically sealed thereto for sealing said coil means from the interior of said can member, said can member being at least partially supported by said end members, and a linearly movable element and driving mechanism therefor positioned within said can member for actuation by said coil means.

10. In a linear motion device the combination comprising a generally tubular relatively heavy unitary pressure housing fabricated from a magnetically permeable material and having a straight through bore extending along at least a substaintial portion of the longitudinal dimension thereof, a pair of annular end closures inserted respectively into the ends of said housing and hermetically secured and sealed thereto, a plurality of generally tubular coil means and annular end magnetic circuit members therefor closely fitted within the bore of said housing, means for positioning said coil means between said end closures, said housing and said end members being positioned to complete the magnetic circuit of each of said coil means, a relatively thin non-magnetic can member extending continuously between said end closures and being hermetically sealed thereto for sealing said coil means from the interior of said can member, said can member being at least partially supported by said end members, a linearly movable element and driving mechanism therefor positioned within said can member for actuation by said coil means, said driving mechanism including a path-defining sleeve member for said linear element positioned coaxially within said bore and extending substantially therethrough, means for clamping said sleeve member to one of said end closures at a position axially outwardly of the adjacent end of said can member, means for slidably mounting the other end of said sleeve member adjacent the other of said end closures at a position axially outwardly of the other adjacent end of said can member to permit differential longitudinal displacement of said sleeve relative to said bore without wearing engagement with said can, at least one linearly movable tubular armature slidably mounted on said sleeve member for actuation by said coil means, said armature being spaced inwardly from the adjacent surface of said can member to prevent contact therewith and attendant wear thereof.

References Cited

UNITED STATES PATENTS

| | | | |
|---|---|---|---|
| 2,831,990 | 4/1958 | Young | 310—14 |
| 3,158,766 | 11/1964 | Frisch | 310—14 |

J. D. MILLER, *Primary Examiner.*

D. F. DUGGAN, *Assistant Examiner.*